(No Model.)
H. C. SPALDING.
ELECTRICAL CABLE.
No. 327,493. Patented Sept. 29, 1885.
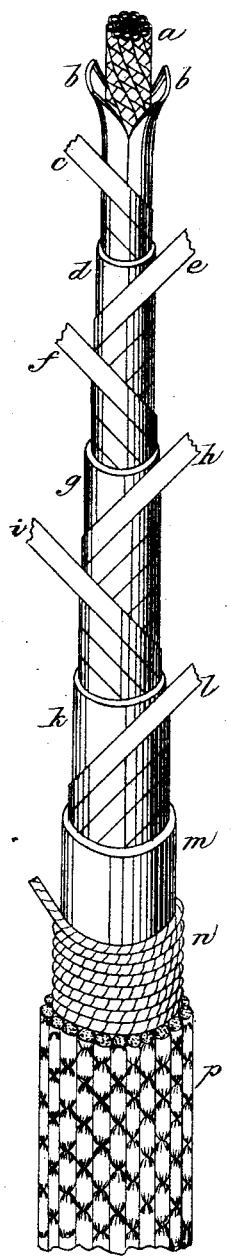
WITNESSES
Aby. L. Hayes
CB Welch
INVENTOR
Henry C. Spalding

United States Patent Office.

HENRY C. SPALDING, OF BOSTON, MASSACHUSETTS.

ELECTRICAL CABLE.

SPECIFICATION forming part of Letters Patent No. 327,493, dated September 29, 1885.

Application filed December 10, 1883. Renewed February 28, 1885. (No model.)

*To all whom it may concern:*

Be it known that I, HENRY C. SPALDING, a citizen of the United States, residing at Boston, in the county of Suffolk and State of Massachusetts, have invented certain new and useful Improvements in Electrical Cables, of which the following is a specification, reference being had to the drawings accompanying and forming a part of the same.

My present invention relates to electrical cables containing one or more conductors surrounded by an insulating material and inclosed in a wrapping or jacket for imparting the requisite compactness and strength.

My object is to produce a light and flexible cable, which shall have at the same time great tensile strength and durability; and to this end I employ, in combination with a conductor or group of conductors and the coatings or layers of material surrounding and insulating the same, a coating of plastic insulating material, a serving of twine spirally wound, and an inclosing-jacket of braided twine.

The specific nature and purpose of this means of protection will be more fully explained by reference to the accompanying drawing, which is that of a cable constructed in accordance with my invention.

It will be understood that the specific character of the conductor or conductors contained in this cable and the means for insulating or otherwise protecting them may be greatly varied. I prefer, however, to use in combination with the wrapping or jacket which forms the subject of my invention a system of insulation and protection invented by me and described more fully in other applications now pending.

The letter $a$ designates the conducting-wires, which are individually insulated or not, as circumstances may render desirable. Around them is a layer of insulating material formed by two oppositely-laid strips of plastic material, $b\ b$. Upon this material is wound spirally a strip or ribbon, $c$, of metal foil. On this is laid a coating of resinous varnish, $d$. Next is wound a layer of paper from a strip, $e$, then a second layer of metal foil, $f$, which in turn is coated with the resinous varnish $g$. In a similar way other layers are formed in the order named—a layer of spirally-wound paper, $h$, a layer of tin-foil, $i$, a coat of resinous varnish, $k$, and a final layer of paper, $l$. This completes the insulation of the conductors, and provides against induction and retardation.

In order, now, to render the whole compact, to protect it from abrasion and to give it the requisite tensile strength, I apply an armor or external protecting-jacket in the following manner: Over the paper $l$, I apply a coating of a plastic compound, $m$, for which I use refined Trinidad asphalt, rendered perfectly viscous by the addition of some substance which maintains it in a slightly plastic condition—such as linseed-oil or the residuum of petroleum-still. Other compounds of like nature may, however, be used. In this coating, while it is yet hot, I wind a layer of twine, $n$. For this I use stout twine, preferably hemp, and draw it tight, so that the cable will be rendered compact thereby. The insulating material $m$ saturates the twine and produces an impervious coating. I then form a braided jacket, $p$, around the spirally-wound twine, using therefor stout cord or twine, preferably hemp.

The twine $n$ and $p$ may be tarred, either before or after its application.

I thus produce a light, flexible, and strong cable. These qualities adapt it particularly for underground use or for laying in inland waters, though it may be used for all purposes to which cables generally are applied.

I am aware that cables have been covered with braided jackets and spirally-wound layers of cord or twine. In no instance of which I am aware, however, have a spirally-wound layer of twine and a braided jacket of like material been combined in the manner described; and in this my invention consists.

What I claim is—

In an electrical cable, the combination, with the conductors and insulating layers or coatings, of a coating of viscous insulating material, a serving of spirally-wound twine embedded therein, and an inclosing-jacket of braided twine, substantially as set forth.

In witness whereof I have hereunto signed my name in the presence of two subscribing witnesses.

HENRY C. SPALDING.

Witnesses:
ALEXANDER L. HAYES,
E. B. WELCH.